(12) United States Patent
Pangasa (10) Patent No.: US 10,388,048 B2
(45) Date of Patent: Aug. 20, 2019

(54) SIMPLIFIED MECHANISM FOR DISPLAYING MULTIPLE DOCUMENTS ON A MOBILE DEVICE

(71) Applicant: Adobe Inc., San Jose, CA (US)

(72) Inventor: Ankit Pangasa, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/249,042

(22) Filed: Aug. 26, 2016

(65) Prior Publication Data
US 2018/0061101 A1   Mar. 1, 2018

(51) Int. Cl.
*G06T 11/60* (2006.01)
*G06F 3/0346* (2013.01)
*G09G 5/14* (2006.01)

(52) U.S. Cl.
CPC ............ *G06T 11/60* (2013.01); *G06F 3/0346* (2013.01); *G09G 5/14* (2013.01); *G09G 2320/08* (2013.01); *G09G 2340/10* (2013.01); *G09G 2340/145* (2013.01); *G09G 2354/00* (2013.01); *G09G 2370/022* (2013.01); *G09G 2370/027* (2013.01)

(58) Field of Classification Search
None
See application file for complete search history.

(56) References Cited

U.S. PATENT DOCUMENTS

| | | | | |
|---|---|---|---|---|
| 7,971,149 B2* | 6/2011 | Hartmann | ............... | G06T 7/33 715/763 |
| 9,035,880 B2* | 5/2015 | Elyada | ............... | G09G 5/00 345/158 |
| 2008/0175484 A1* | 7/2008 | Hartmann | ............ | G06F 17/2211 382/195 |
| 2010/0177121 A1* | 7/2010 | Homma | ............... | G06F 3/0416 345/659 |
| 2010/0194705 A1* | 8/2010 | Kim | ............... | G06F 1/1626 345/173 |
| 2011/0084893 A1* | 4/2011 | Lee | ............... | G06F 1/1649 345/6 |
| 2011/0197121 A1* | 8/2011 | Kletter | ............... | G06F 17/2211 715/234 |
| 2012/0268391 A1* | 10/2012 | Somers | ............... | G06F 1/1694 345/173 |
| 2013/0091462 A1* | 4/2013 | Gray | ............... | G06F 3/0346 715/810 |
| 2013/0328792 A1* | 12/2013 | Myers | ............... | G06F 1/1652 345/173 |
| 2014/0006922 A1* | 1/2014 | Smith | ............... | G06F 17/2211 715/234 |
| 2014/0184530 A1* | 7/2014 | Hyun | ............... | G06F 1/1626 345/173 |

(Continued)

*Primary Examiner* — Howard Cortes
(74) *Attorney, Agent, or Firm* — SBMC (57) ABSTRACT

A simplified mechanism for displaying multiple documents on a mobile device is described. In embodiments, a tilt angle of a housing of the mobile device is detected to determine whether the mobile device is tilted. Based on the tilt angle, a transparency setting is automatically modified for a first document of an application that is displayed via a display device of the mobile device is. Then, a second document of the application is caused to be visible via the display device in response to the transparency setting being modified for the first document. In this way, a user can simply tilt the mobile device to switch between documents.

20 Claims, 9 Drawing Sheets

(56) References Cited

U.S. PATENT DOCUMENTS

| | | | |
|---|---|---|---|
| 2015/0123992 A1* | 5/2015 | Mahan | G06T 11/60 |
| | | | 345/629 |
| 2016/0042723 A1* | 2/2016 | Lee | G06T 3/0056 |
| | | | 345/639 |
| 2016/0124613 A1* | 5/2016 | Finn | G06F 3/04842 |
| | | | 715/835 |
| 2016/0189405 A1* | 6/2016 | Lyons | G06T 11/001 |
| | | | 345/592 |

* cited by examiner

```
┌─────────────────────────────────────────────────────────────────┐
│ Control a display of multiple documents of an application based on a │
│ tilt angle of a housing of the mobile device, the multiple documents │
│ including at least a first document and a second document       │
│                              802                                │
└─────────────────────────────────────────────────────────────────┘
┌─────────────────────────────────────────────────────────────────┐
│ Responsive to the tilt angle indicating that the housing is not tilted, decrease a │
│ transparency setting of the first document and increase a transparency setting of │
│ at least the second document effective to cause the first document to be visible │
│                              804                                │
└─────────────────────────────────────────────────────────────────┘
                                  ↓
┌─────────────────────────────────────────────────────────────────┐
│ Responsive to the tilt angle indicating that the housing is tilted │
│ based on a comparison of the tilt angle with a tilt threshold,  │
│ automatically decrease the transparency setting of the second   │
│ document and increase the transparency setting of at least the first │
│ document effective to cause the second document to be visible   │
│                              806                                │
└─────────────────────────────────────────────────────────────────┘
                                  ↓
┌─────────────────────────────────────────────────────────────────┐
│ Based on a comparison of the tilt angle with an additional tilt threshold, │
│ automatically decrease a transparency setting of a third document of the │
│ multiple documents and increase the transparency setting of each of the first │
│ and second documents effective to cause the third document to be visible │
│                              808                                │
└─────────────────────────────────────────────────────────────────┘
```

SIMPLIFIED MECHANISM FOR DISPLAYING MULTIPLE DOCUMENTS ON A MOBILE DEVICE

BACKGROUND

Presentation of content in mobile devices is generally restricted by screen size. Because of this, developers struggle to deliver maximum value with a limited display area. One challenge is introduced when presenting multiple documents simultaneously. For example, while two documents may be displayed gracefully side by side on a single screen of a desktop or laptop computer, these same two documents displayed via a 5-inch display of a mobile device may be too small to provide any value to a user. Conventional use of such a small display may require a plurality of user inputs to switch between documents and/or magnify the documents for viewing, which can be cumbersome because of the number of user inputs required to view and/or compare both documents.

SUMMARY

A simplified mechanism is described for displaying multiple documents on a mobile device. In one or more embodiments, a tilt angle of a housing of the mobile device is detected to determine whether the mobile device is tilted. Based on the tilt angle, a transparency setting is automatically set for a first document of an application that is displayed via a display device of the mobile device is. Then, a second document of the application is made visible via the display device in response to the transparency setting of the first document being set. In this way, a user can simply tilt the mobile device to switch between documents.

These simplified techniques for displaying multiple documents allow a user to view multiple documents simultaneously on a device without explicit interacting with the software application executing on the device. For example, using these techniques, a user can easily navigate between documents, or control an amount of each document that is displayed, without any finger interaction being required. Further, these techniques can be implemented to display a wide variety of content including images, web pages, pdfs, text, video, and so on. These techniques can also be implemented on a variety of different devices, such as iOS® devices, Android® devices, Windows® devices, and so on.

This Summary introduces features and concepts of a simplified mechanism for displaying multiple documents on a mobile device, which are further described below in the Detailed Description and/or shown in the Figures. This Summary should not be considered to describe essential features of the claimed subject matter, nor used to determine or limit the scope of the claimed subject matter.

BRIEF DESCRIPTION OF THE DRAWINGS

Techniques for a simplified mechanism for presenting multiple documents on a mobile device are described with reference to the following Figures. Entities represented in the Figures may be indicative of one or more entities and thus reference may be made interchangeably to single or plural forms of the entities in the discussion. The same numbers may be used throughout to reference like features and components that are shown in the Figures.

DETAILED DESCRIPTION

Overview

The techniques described herein provide a user-friendly way to display the multiple documents without requiring the user to explicitly interact with an application used to display the documents. Instead, the user simply tilts the mobile device to switch between the documents. For example, when the mobile device is tilted, a transparency is applied to a displayed document and a background document becomes visible. In a comparison workflow, for example, the user may wish to have three different documents in view: an initial document, an updated document that is a modified version of the initial document, and a comparison document that highlights differences between the initial document and the updated document. In at least one embodiment, the comparison document is visible when the mobile device is level, or at a default orientation. When the user tilts the mobile device one direction (e.g., left about an axis), the comparison document becomes transparent and the initial document becomes visible. When the user tilts the mobile device another direction (e.g., right about the axis), the initial document and the comparison document become transparent and the updated document becomes visible.

Tilt sensors in the mobile device detect an orientation, such as coordinate information, of the housing of the mobile device relative to a reference plane. In some embodiments, the reference plane represents a "flat" orientation that has no tilt with respect to gravity. As the mobile device is tilted, the tilt sensors detect a change to the tilt angle, and the transparency setting of each document is set based on the tilt angle. In at least one embodiment, the transparency settings are set in real time proportionally to a change in the tilt angle within a predefined range of tilt angle, such as by gradually adjusting the transparency setting between a zero-degree tilt and a twenty-degree tilt. By gradually applying transparency to the documents, there may be some resulting visual overlap between the displayed documents, which can provide the user with a visual transition between the documents.

Alternatively, the transparency setting is set in response to the tilt angle reaching a predetermined value, such as by automatically changing the transparency setting from zero percent to one hundred percent in response to reaching a tilt threshold value (e.g., twenty-degree tilt). Accordingly, the amount of each document that is viewable is controlled by simply tilting the mobile device.

The documents can be arranged in any order. For instance, as described above, the initial document can be mapped to a function that controls its transparency setting based on a left tilt, while the modified document can be mapped to a different function that controls its transparency setting based on a right tilt. This example arrangement, however, can be reversed. Other arrangements are also contemplated, such as the initial document being mapped to the left tilt, the modified document mapped to the default orientation (e.g., no-tilt), and the comparison document mapped to the right tilt. Accordingly, the documents can be mapped to a variety of different arrangements of tilt angles, and are not necessarily limited to the arrangements described above.

In one or more embodiments, the term "tilt angle", as used herein, may refer to an amount of tilt, or rotation about one or more axes, of a mobile device relative to a reference plane. For example, the tilt angle can be represented by at least one of x, y, or z-coordinates of the mobile device, or of different portions of the mobile device, that are used to determine an angular position of the mobile device with respect to the reference plane, such as a "flat" or level orientation (e.g., parallel with ground).

The modification of the transparency setting of the displayed documents is considered "automatic" because it is performed without receiving explicit input from the user to the application used to display the documents. Rather, the user tilts the mobile device, or the housing of the mobile device, and the transparency setting is automatically modified in response to the tilt.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that are operable to use the techniques and systems described herein in accordance with one or more embodiments.

Example Environment

Figure 1:
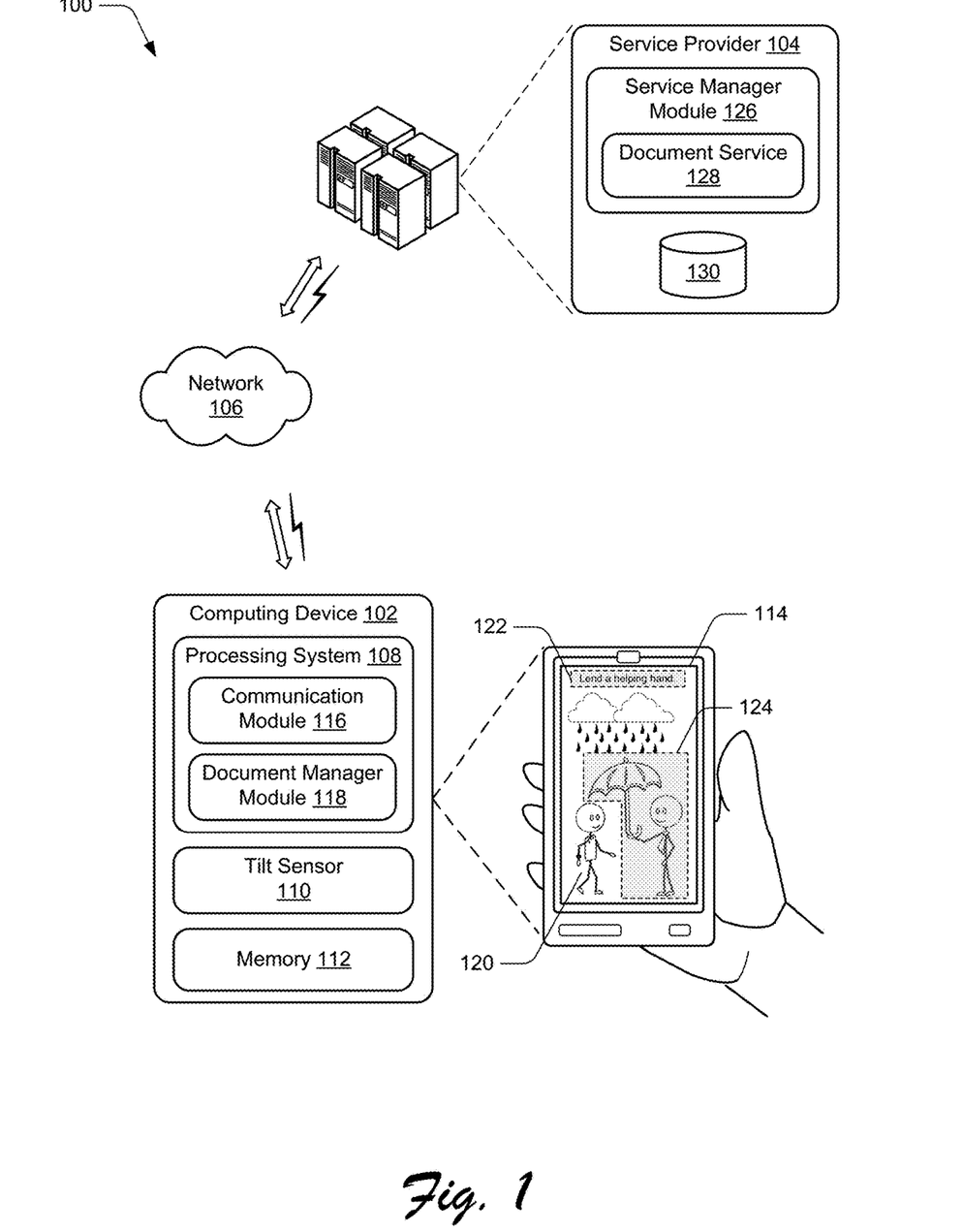
FIG. 1 is an illustration of an environment in an example embodiment that is operable to employ techniques described herein.

FIG. 1 is an illustration of an environment 100 in an example embodiment that is operable to employ techniques described herein. The illustrated environment 100 includes a computing device 102 and a service provider 104 that are communicatively coupled via a network 106. The computing device 102, as well as computing devices that implement the service provider 104, may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 104 utilized by a business to perform operations "over the cloud" as further described in relation to FIG. 9, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The computing device 102 is illustrated as including a variety of hardware components, examples of which include a processing system 108, a tilt sensor 110, an example of a computer-readable storage medium illustrated as memory 112, a display device 114, and so on. The processing system 108 is representative of functionality to perform operations through execution of instructions stored in the memory 112. Although illustrated separately, functionality of these components may be further divided, combined (e.g., on an application specific integrated circuit), and so forth.

The tilt sensor 110 is representative of functionality to detect an orientation, such as a tilt angle, of the computing device 102. Any of a variety of different tilt sensors can be utilized to determine the tilt angle or orientation of the computing device 102 relative to a reference tilt angle or a reference plane. The tilt sensor 110 measures a tilting position with reference to gravity. Further, the tilt sensor 110 detects changes to the tilt angle that are usable to cause changes to displayed content, further details of which are described below. Although a single tilt sensor is illustrated, a plurality of sensors can be utilized to detect the orientation of the computing device 102.

The processing system 108 is illustrated as executing a communication module 116 and a document manager module 118, all of which are storable in the memory 112 and as such are implemented at least partially in hardware. The communication module 116 and the document manager module 118 are executable by the processing system 108 to cause performance of one or more operations. Other embodiments are also contemplated, such as dedicated hardware components, e.g., application specific integrated circuit, fixed-logic circuitry, and so forth.

The communication module 116 is representative of functionality to communicate via the network 106, such as with one or more services of the service provider 104. As such, the communication module 116 may be configured in a variety of ways. For example, the communication module 116 may be configured as a browser that is configured to "surf the web." The communication module 116 may also be representative of network access functionality that may be incorporated as part of an application, e.g., to provide network-based functionality as part of the application, an operating system, and so on. Thus, functionality represented by the communication module 116 may be incorporated by the computing device 102 in a variety of different ways.

The document manager module 118 is representative of functionality to manage content on the computing device 102. As such, the document manager module 118 may be configured in a variety of ways. For example, the document manager module 118 may be configured to control an amount of each of multiple documents that is viewed in a display of the computing device 102 based on the computing device being tilted. In at least one embodiment, the document manager module 118 can be configured to display a comparison document having annotations identifying differences between an initial document and a modified document. In an example, the comparison document includes content 120 from the initial document that remains unchanged in the modified document. Content that has been changed, however, is identified or marked by the annotations, such as highlighted portion 122 identifying inserted text or highlighted portion 124 identifying an inserted image.

The document manager module 118 can define a transparency of at least one of the documents to allow another document to be displayed when the computing device 102 is sufficiently tilted in a certain direction about an axis. In at least one example, the comparison document is displayed when the computing device 102 has no tilt relative to a reference position. Tilting the computing device 102 to one side, however, causes the document manager module 118 to increase the transparency of the comparison document to enable the initial document to be displayed, and tilting the computing device to the other side causes the modified document to be displayed by applying transparency to both the comparison document and the initial document. Further discussion of these and other features is provided below.

The service provider 104 is representative of functionality of the service provider 104 to provide one or more network-based services. The services are managed by a service manager module 126 to support a variety of different functionality. The services (e.g., web services), for instance, may be configured to support document service 128. The document service 128 is configured to provide functionality such as word processing, document comparison, spreadsheets, graphics composition, graphics editing, presentations, multimedia editing, three-dimensional scene rendering for video and/or film, video and/or motion graphics rendering, video transcoding, and so on. Thus, a variety of different types of content may be displayed and/or edited (e.g., created and/or modified) by the services, which may be maintained in the storage 130 of the service provider 104. In at least some embodiments, the service provider 104 generates one or more of the documents and communicates the documents for display via the display device 114 of the computing device 102.

Example Embodiment

The following discussion describes example embodiments of a simplified mechanism for presenting multiple documents on a mobile device that can be employed to perform various aspects of techniques discussed herein. The example embodiments may be employed in the environment 100 of FIG. 1, the system 900 of FIG. 9, and/or any other suitable environment.

Figure 2:
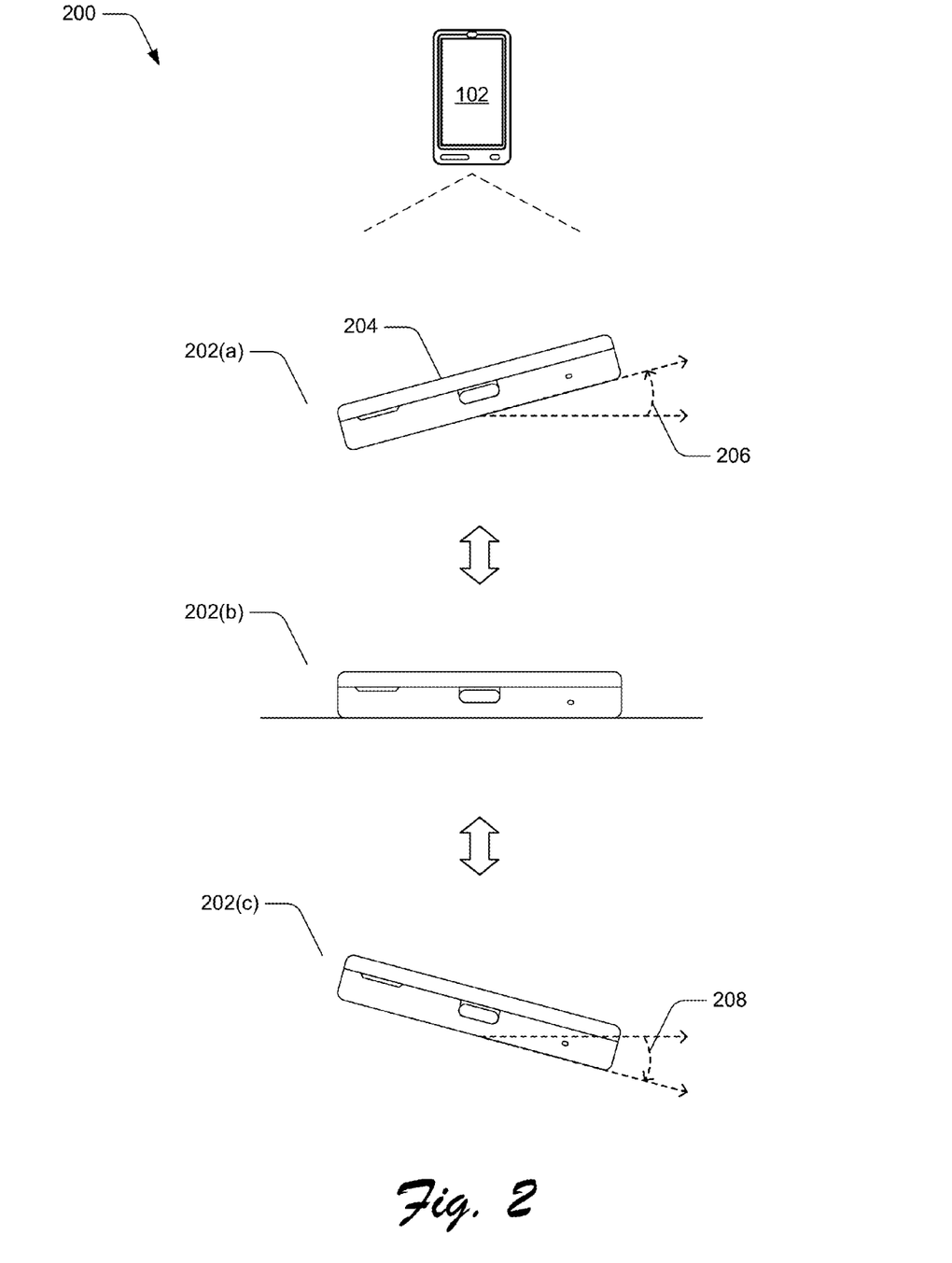
FIG. 2 is an illustration of example orientations of a mobile device used to implement techniques described herein.

FIG. 2 is an illustration 200 of example orientations of a mobile device used to implement techniques described herein. For instance, FIG. 2 shows three different example orientations 202(a)-(c) viewed from a bottom side of the computing device 102. The computing device 102 includes a housing 204 that can be tilted in a variety of different directions about a variety of different axes in a three-dimensional space. The tilt sensor 110 detects coordinate information (e.g., x, y, and z coordinates) of the housing 204 relative to a reference plane, and the coordinate information is then used to determine the orientation of the computing device 102.

In the example orientation 202(a), the housing 204 is tilted in a counterclockwise direction about a longitudinal axis of the computing device 102. The tilt sensor 110 from FIG. 1 detects a tilt angle 206 that indicates an amount of tilt relative to a reference position, such as a reference plane or angle. The reference position represents any of a variety of values used to determine the orientation of the computing device 102. The reference position, for instance, can be represented by a level (e.g., no tilt) orientation with respect to a reference plane. An example illustration of a level orientation is shown in orientation 202(b), which has no tilt with respect to gravity. The example orientation 202(c) is illustrated as being tilted in an opposite direction to that of the orientation 202(a), and includes a tilt angle 208 relative to the reference position (e.g., level orientation). Here, the tilt angle 208 indicates that the housing is tilted in a clockwise direction about the longitudinal axis of the computing device 102.

In at least one embodiment, a variety of different application programming interfaces (APIs) can be used to calculate the tilt angle of the housing. In one example, the tilt angle is determined by using the following API:

```
mSensorManager = (SensorManager) getSystemService
(Context.SENSOR_SERVICE);
mOrientation = mSensorManager.GetDefaultSensor
(Sensor.TYPE_ORIENTATION);
...
Public void onSensorChanged(SensorEvent event) {
    xy_angle = event.values[0];
    xz_angle = event.values[1];
    zy_angle = event.values[2] }
```

Accordingly, the document manager module 118 determines the tilt angle based on information obtained from the tilt sensor 110. Using the tilt angle, the document manager module 118 performs a variety of functions, examples of which are illustrated in FIG. 3.

Figure 3:
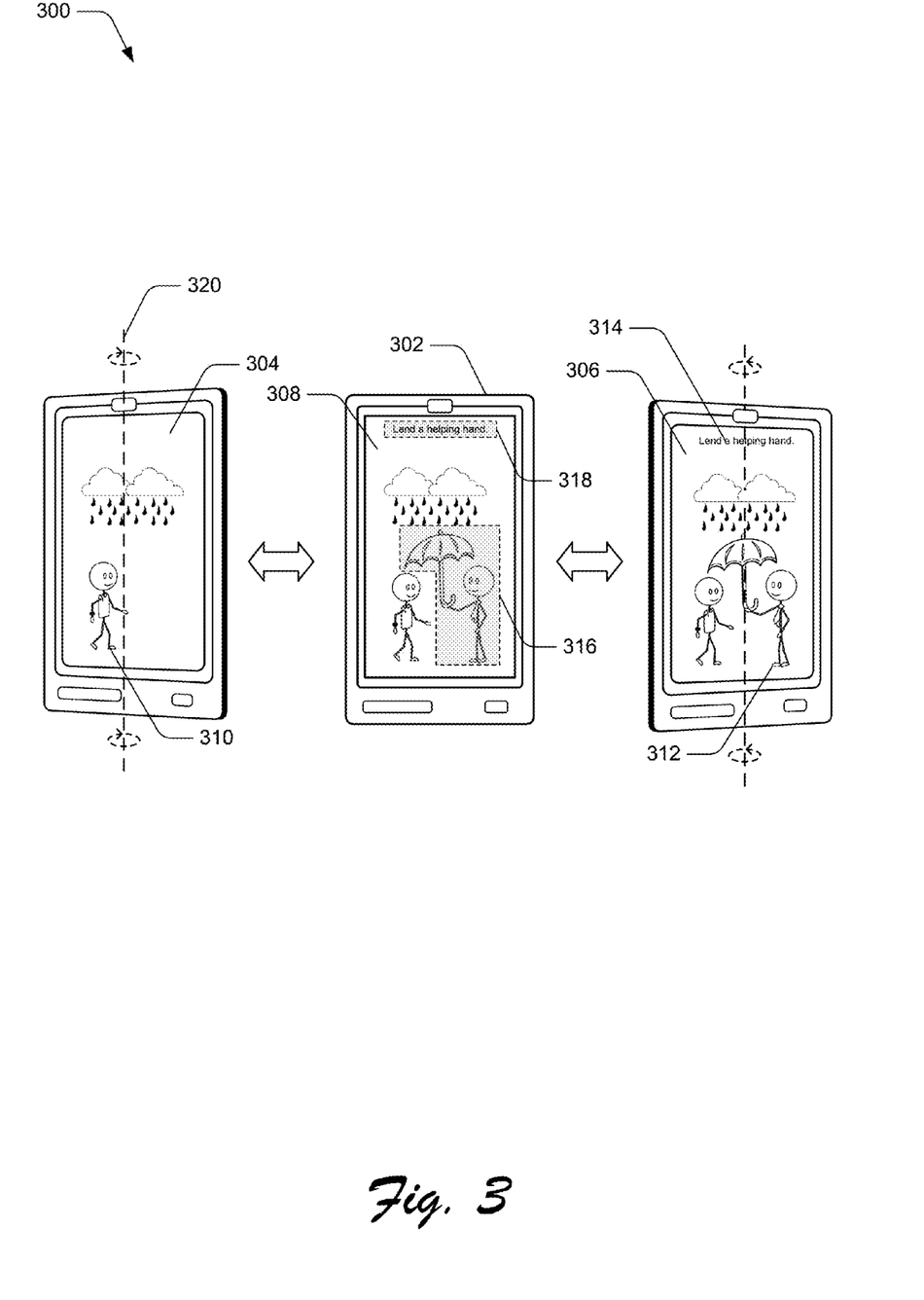
FIG. 3 illustrates an example computing device that is operable to utilize techniques for presenting multiple documents on a mobile device in accordance with one or more embodiments.

FIG. 3 illustrates an example computing device 300 that is operable to utilize techniques for presenting multiple documents on a mobile device in accordance with one or more embodiments. In the illustrated example, three different documents are rendered at the same time via an application on a mobile device 302. The three documents in this example include an initial document 304, a modified document 306 that is a modified or updated version of the initial document 304, and a comparison document 308 that includes overlapping results of a comparison between content in the initial document 304 and content in the modified document 306.

Generally, differences between documents include content insertion, modification, or deletion, or modification to form properties. These differences can be indicated in a variety of different ways, such as by using different colored annotations. In addition, the differences can be listed using the annotations. In the illustrated example 300, the initial document 304 includes a scene with a person 310 walking in the rain. The modified document 306 has modified the scene by adding an additional person 312 with an umbrella, and inserting text 314 describing the modified scene. The comparison document 308 includes annotated results of a comparison between the initial document and the modified document. For example, the comparison document 308 includes annotations 316 and 318 (e.g., highlights) identifying the added content from the modified document 306.

Because of the small size of the display device of the mobile device 302, displaying two or all three documents for a side-by-side comparison is not feasible because the documents would be unreadable to the user. Here, however, a user can simply position the mobile device 302 without any tilt angle (e.g., in a level orientation) to view the comparison document 308. In this position, transparency settings of both the initial document 304 and the modified document 306 are set to approximately maximum (e.g., 100%).

Then, to switch to the initial document 304, the user simply tilts the housing of the mobile device 302 to the left about a longitudinal axis 320 of the mobile device 302. Doing this causes a transparency setting of the comparison document 308 to be increased, while a transparency setting of the initial document 304 is decreased. Modifying the transparency settings in this way results in the initial document 304 becoming visible while the comparison document 308 fades away.

When the user tilts the housing back toward the level orientation, the transparency setting of the initial document 304 is increased and the transparency setting of the comparison document 308 is decreased, causing the initial document 304 to disappear from view and the comparison document 308 to become visible. If the user tilts the housing to the right, the transparency setting of the comparison document 308 is increased and a transparency setting of the modified document 306 is decreased to bring the modified document 306 into view. Using these techniques, the user can simply tilt the housing of the mobile device 302 to switch between the three documents without explicitly interacting with the application used to display the documents.

While these examples are described using the longitudinal axis 320 of the mobile device 302, other axes are also contemplated and can be utilized to modify the displayed content. For instance, a lateral axis of the mobile device can be used to switch between documents by tilting the mobile device forward (e.g., away from the user) or back (e.g., toward the user). Alternatively, a combination of multiple axes can be used to implement the techniques described herein. Using the longitudinal axis, however, may be more consistent with current navigation techniques that use left and right swiping, or left and right tab selection, to navigate content. Because of this, tilting the mobile device 302 left and/or right may be more intuitive than tilting the mobile device 302 in other directions. Nevertheless, any tilt direction can be utilized to implement the techniques described herein.

Figure 4:
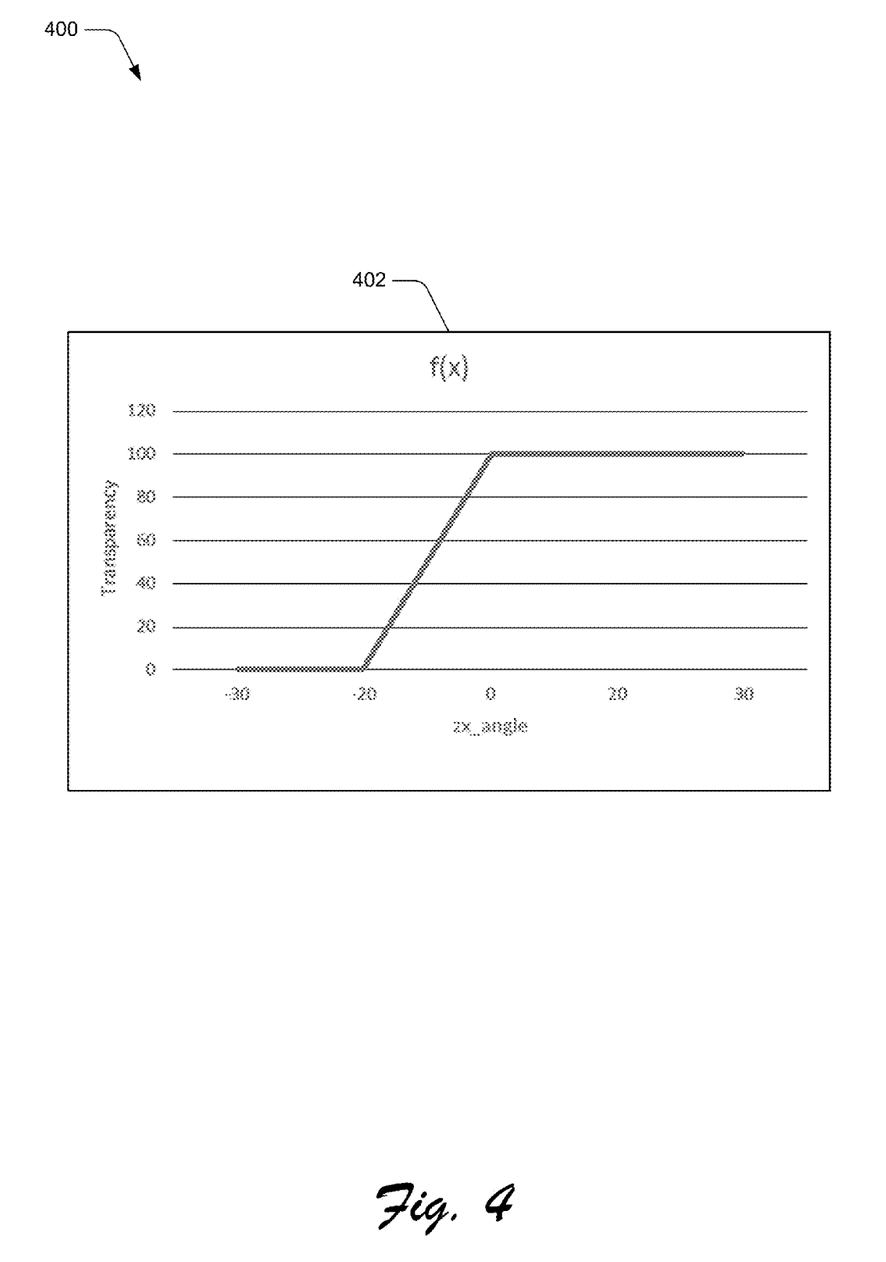
FIG. 4 illustrates an example chart representing a function that shows a transparency setting of a document relative to a tilt angle of a mobile device in accordance with one or more embodiments.

FIG. 4 illustrates an example chart 400 representing a function that shows a transparency setting of a document relative to a tilt angle of a mobile device in accordance with one or more embodiments. In one example, graph 402 represents the transparency setting of a document, such as the initial document 304 from FIG. 3. The transparency setting of the initial document 304 is set at approximately 100% when the tilt angle (e.g., zx_angle) is approximately zero, and remains at approximately 100% when the tilt angle has a positive value, which indicates that the mobile device is tilted to the right. However, as the mobile device is tilted toward the left, the transparency setting is decreased until reaching approximately zero when the tilt angle is approximately −20 degrees or less.

In some embodiments, the transparency setting is modified proportionally to the change in the tilt angle between a reference tilt angle and a threshold tilt angle. This change can occur gradually, or can be substantially instantaneous based on the threshold tilt angle. A twenty-degree tilt to the left may be sufficient to indicate the user's intent to tilt the mobile device without substantially degrading the user's view of the displayed content. However, any suitable degree of tilt can be utilized as a threshold to indicate sufficient tilt for modifying the displayed content.

Figure 5:
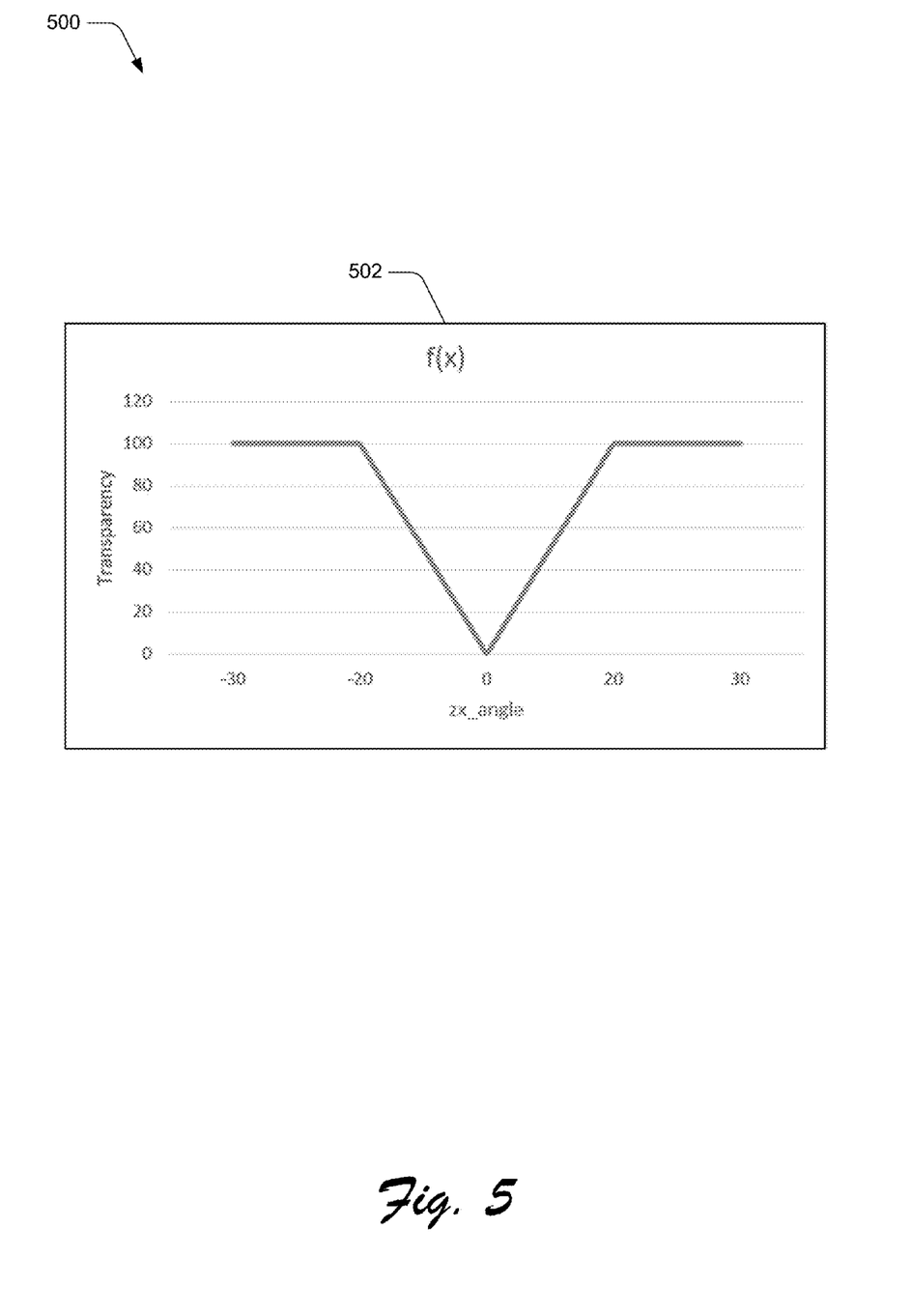
FIG. 5 illustrates an example chart representing a function that shows a transparency setting of a document relative to a tilt angle of a mobile device in accordance with one or more embodiments.

FIG. 5 illustrates an example chart 500 representing a function that shows a transparency setting of a document relative to a tilt angle of a mobile device in accordance with one or more embodiments. This function is associated with the transparency setting of another document, such as the comparison document 308 from FIG. 3. Continuing with the above example, the transparency setting of the comparison document 308 is set to approximately zero when the mobile device is positioned with no tilt. As the mobile device is tilted toward the left, the transparency setting is increased to cause the display of the comparison document 308 to fade away until the comparison document 308 is no longer visible at a tilt angle of approximately −20 degrees or less.

On the other hand, when the mobile device is tilted toward the right from the no-tilt position, the transparency setting is increased to reduce visibility of the comparison document 308 until the comparison document 308 is no longer visible at a tilt angle of approximately 20 degrees or more. Causing the transparency setting to be increased allows another document to become visible in the display. As described above, any suitable angle can be used as a tilt threshold for determining when to modify the transparency setting. Further, the transparency setting can be modified in real time proportionally to the change in the tilt angle, or can be modified responsive to the tilt angle reaching the tilt threshold.

Figure 6:
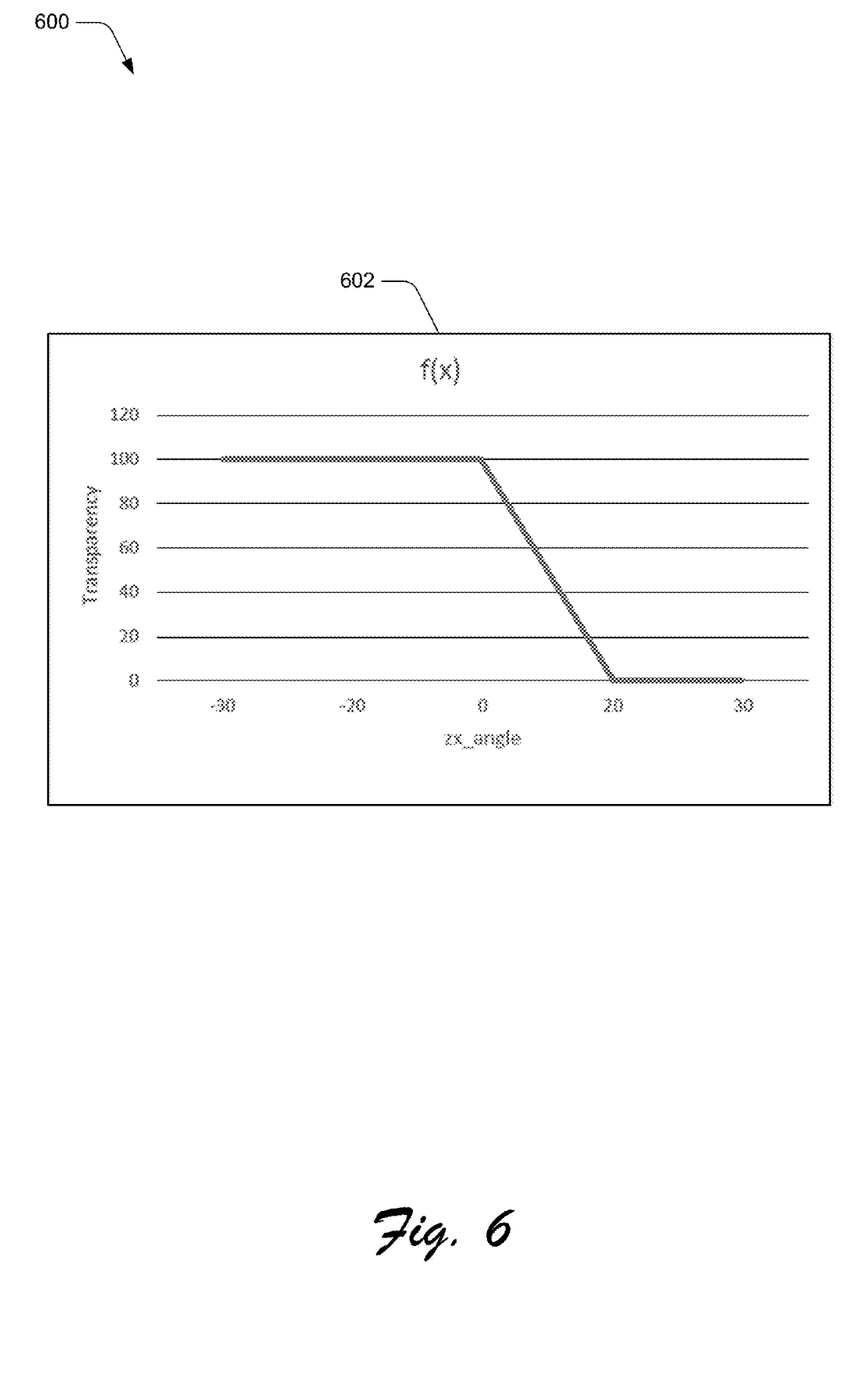
FIG. 6 illustrates an example chart representing a function that shows a transparency setting of a document relative to a tilt angle of a mobile device in accordance with one or more embodiments.

FIG. 6 illustrates an example chart 600 representing a function that shows a transparency setting of a document relative to a tilt angle of a mobile device in accordance with one or more embodiments. This function is associated with the transparency setting of yet another document, such as the modified document 306 from FIG. 3. Continuing with the above example, when the mobile device has no tilt or is tilted to the left, the transparency setting of the modified document 306 is set to approximately 100% effective to cause the modified document 306 to be hidden. As the mobile device is tilted toward the right, however, the transparency setting of the modified document 306 is decreased to cause the modified document 306 to become visible. For example, the transparency setting of the modified document 306 is reduced to approximately zero when the mobile device is tilted to the right approximately 20 degrees or more. As described above, any suitable tilt angle can be used as a threshold for determining when to modify the transparency setting of a document.

Combining the transparency functions of FIGS. 4-6 results in a user-friendly mechanism for switching a display between different, simultaneously-displayed documents presented via an application on a mobile device. No explicit user interaction with the application is required. For instance, the transparency function for the comparison document in FIG. 5 is the linear combination of the transparency function for the initial document in FIG. 4 and the transparency function for the modified document in FIG. 6 based on the tilt angle. Specifically, $f_5(x)=f_6(x)-f_4(x) \forall x<0$, and $f_5(x)=f_4(x)-f_6(x) \forall x \geq 0$, where $f_i(x)$ is the transparency setting for the $i^{th}$ FIG., i=4, 5, 6, and x is the tilt angle. Accordingly, the transparency function of the comparison document in FIG. 5 is determined by combining respective transparency functions, based on the tilt angle, of the initial document and the modified document, which are different documents than the comparison document. Hence, a transparency setting of a first document is modified by combining respective transparency settings, based on the tilt angle, of two documents that are different documents than the first document. In this way, a user wishing to view multiple documents on a mobile device, particularly for comparison of the multiple documents, can easily switch the display from one document to a previous or next document simply by tilting the mobile device.

Example Procedures

The following discussion describes techniques for a simplified mechanism for presenting multiple documents on a mobile device that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 7:
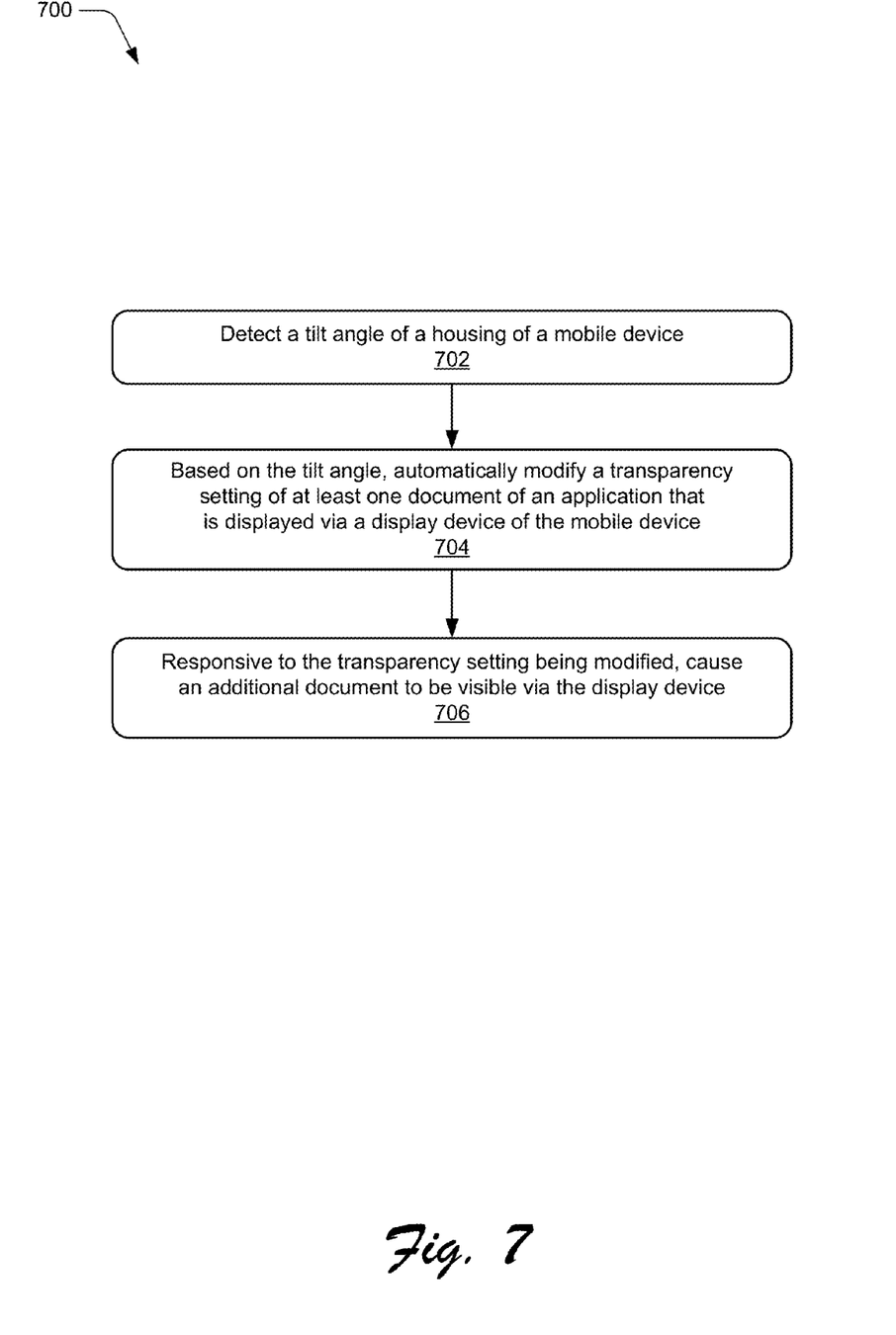
FIG. 7 is a flow diagram depicting an example procedure in accordance with one or more embodiments.

FIG. 7 is a flow diagram depicting an example procedure 700 in accordance with one or more embodiments. In embodiments, a tilt angle of a housing of a mobile device is detected (block 702). The step can be performed in any suitable way. For example, a tilt sensor can be used to detect coordinate information of the housing relative to a reference orientation. One or more APIs can be implemented to analyze the coordinate information to determine a tilt angle of the housing.

Based on the tilt angle, a transparency setting of at least one document of an application that is displayed via a display device of the mobile device is automatically modified (block 704). This step can be performed in any suitable way. For example, when the tilt angle is approximately zero, the transparency setting of a first document is set to approximately zero, and the transparency setting of at least one additional document is set to approximately 100%. If the tilt angle is relatively more than a first threshold tilt angle to the left, then the transparency setting of the first document is increased and the transparency setting of a first additional document is decreased effective to cause the first additional document to be visible via the display device. If, however, the tilt angle is relatively more than a second threshold tilt angle to the right, then the transparency setting of the first document is increased and the transparency setting of a second additional document is decreased effective to cause the second additional document to be visible via the display device.

Figure 8:
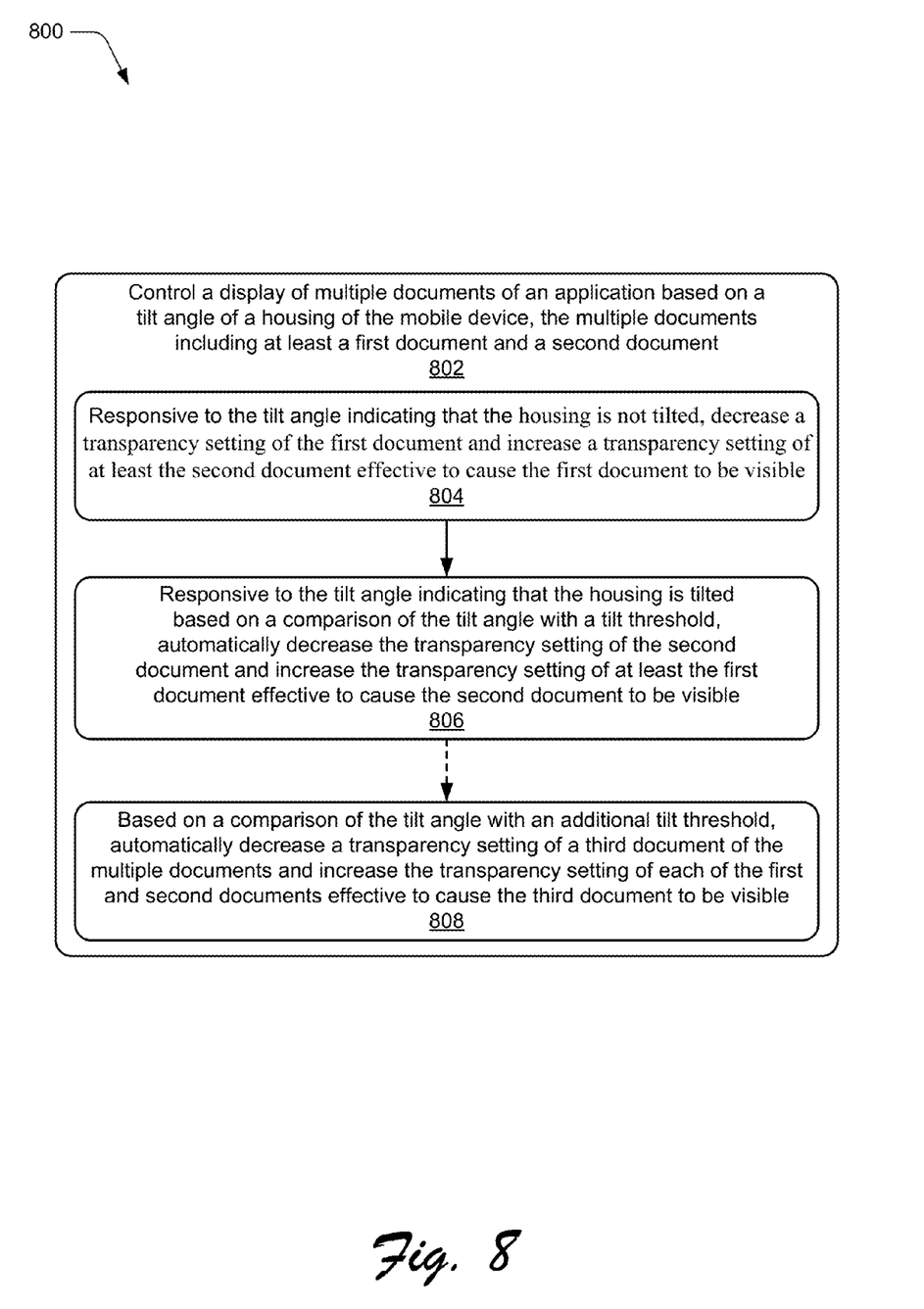
FIG. 8 is a flow diagram depicting an example procedure in accordance with one or more embodiments.

FIG. 8 is a flow diagram depicting an example procedure 800 in accordance with one or more embodiments. In embodiments, a display of multiple documents of an application is controlled based on a tilt angle of a housing of the mobile device (block 802). In at least one example, the multiple documents include a first document and a second document. The display is controlled by at least performing operations described in one or more of blocks 804-808.

For instance, responsive to the tilt angle indicating that the housing is not tilted, a transparency setting of the first document is decreased and a transparency setting of at least the second document is increased effective to cause the first document to be visible (block 804). Responsive to the tilt angle indicating that the housing is tilted based on a comparison of the tilt angle with a tilt threshold, the transparency setting of the second document is decreased and the transparency setting of at least the first document is increased effective to cause the second document to be visible (block 806).

In at least some embodiments, based on a comparison of the tilt angle with an additional tilt threshold, the transparency setting of a third document of the multiple documents is decreased and the transparency setting of each of the first and second documents is increased effective to cause the third document to be visible (block 808).

Example System and Device

Figure 9:
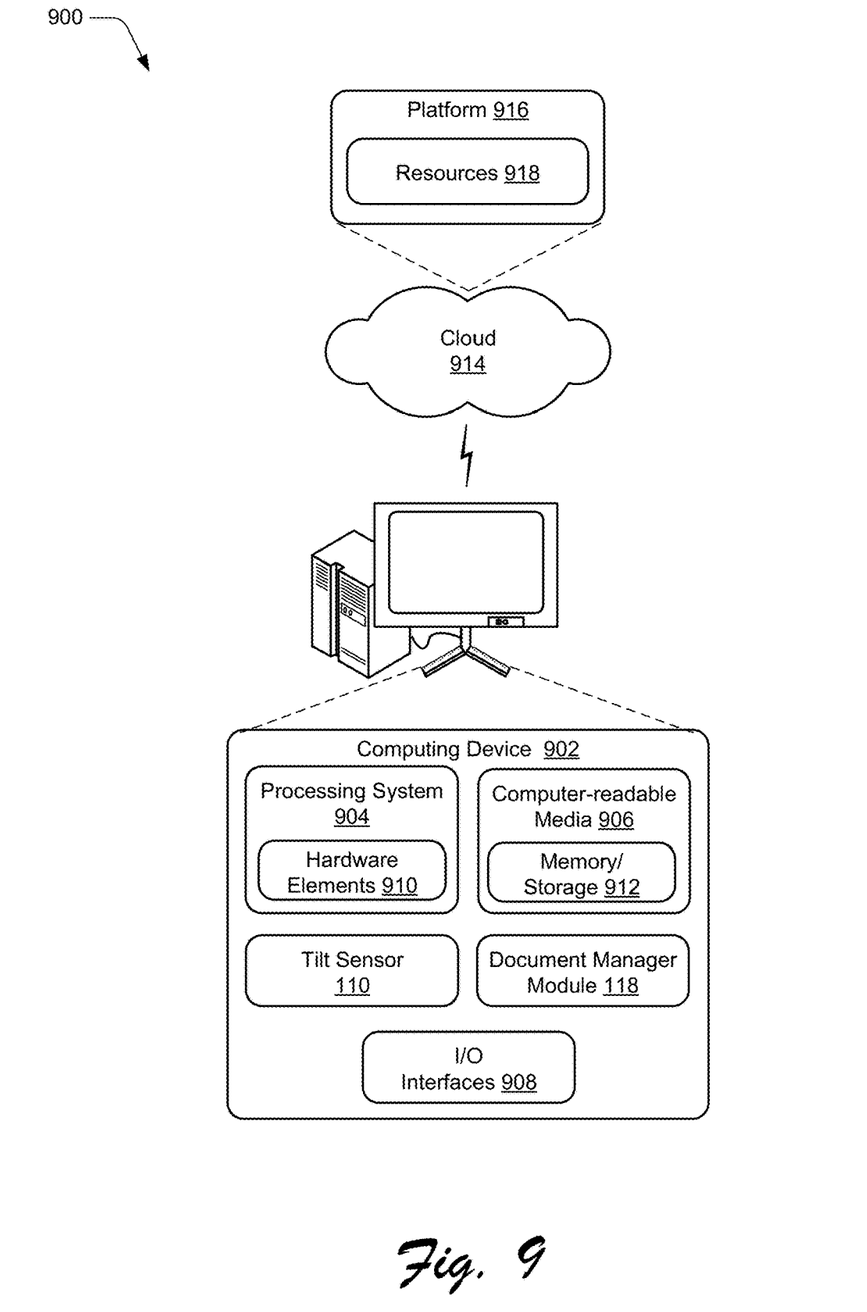
FIG. 9 illustrates various components of an example device that can be implemented as any type of computing device as described herein to implement the techniques described herein.

FIG. 9 illustrates an example system generally at 900 that includes an example computing device 902 that is representative of one or more computing systems and/or devices that may implement the various techniques described herein. This is illustrated through inclusion of the tilt sensor 110 and the document manager module 118. The tilt sensor 110 may be configured to detect an orientation (e.g., tilt angle) of the computing device 902. The document manager module 118 may be configured to control a display of content via a display device of the computing device 902 based on the orientation by automatically modifying a transparency setting of at least one displayed document to cause another document to be visible via the display device. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include embodiments in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other embodiments in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, embodiments of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

Cloud 914 includes and/or is representative of a platform 916 for resources 918. Platform 916 abstracts underlying functionality of hardware (e.g., servers) and software resources of the cloud 914. Resources 918 may include applications and/or data that can be utilized while computer processing is executed on servers that are remote from the computing device 902. Resources 918 can also include services 920 provided over the Internet and/or through a subscriber network, such as a cellular or Wi-Fi network.

Platform 916 may abstract resources and functions to connect computing device 902 with other computing devices. Platform 916 may also serve to abstract scaling of resources to provide a corresponding level of scale to encountered demand for resources 918 that are implemented via platform 916. Accordingly, in an interconnected device embodiment, implementation of functionality described herein may be distributed throughout system 900. For example, the functionality may be implemented in part on computing device 902 as well as via platform 916 that abstracts the functionality of cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for presenting multiple documents on a mobile device, the method comprising:
    detecting, by the mobile device, a tilt angle of a housing of the mobile device;
    automatically modifying, by the mobile device and based on the tilt angle, a transparency setting of at least one of the multiple documents displayable on a display device of the mobile device by combining respective transparency settings, based on the tilt angle, of at least two of the multiple documents different than the at least one of the multiple documents; and responsive to the transparency setting being modified, causing an additional document to be visible via the display device.

2. A method as recited in claim 1, wherein the transparency setting is modified without explicit user interaction with an application used to display the multiple documents.

3. A method as recited in claim 1, wherein the automatically modifying the transparency setting of the at least one of the multiple documents further comprises setting the transparency setting of the at least one of the multiple documents based on a comparison of the tilt angle with a threshold angle.

4. A method as recited in claim 1, wherein the transparency setting of the at least one of the multiple documents is modified proportionally to a change in the tilt angle between a reference tilt angle and a tilt threshold.

5. A method as recited in claim 1, wherein the at least one of the multiple documents includes at least an initial document, an updated document that is a modified version of the initial document, and a comparison document having annotations identifying differences between the initial document and the updated document.

6. A method as recited in claim 5, wherein the comparison document is displayed based on the tilt angle being approximately zero.

7. A method as recited in claim 5, wherein the initial document is displayed responsive to the tilt angle indicating that the mobile device is tilted in a first direction about an axis.

8. A method as recited in claim 5, wherein:
the initial document is displayed responsive to the tilt angle indicating that the mobile device is tilted in a first direction about an axis; and
the updated document is displayed responsive to the tilt angle indicating that the mobile device is tilted in a second direction about the axis, the second direction being different than the first direction.

9. A system implemented in a digital medium environment for presenting a plurality of documents on a mobile device, the system comprising:
a housing of the mobile device;
a tilt sensor configured to detect coordinate information associated with an orientation of the housing relative to a reference plane; and
at least one processor configured to execute instructions stored in at least one computer-readable storage media to implement a document manager module configured to:
determine a tilt angle of the housing based on the coordinate information; and
control an amount of each of the plurality of documents that is viewed in a display based on the determined tilt angle of the housing according to a respective transparency setting of said each of the plurality of documents, the respective transparency setting of said each of the plurality of documents determined by combining respective transparency settings, based on the determined tilt angle, of at least two of the plurality of documents different than said each of the plurality of documents.

10. A system as recited in claim 9, wherein the coordinate information indicates a rotation of the housing about a longitudinal axis of the housing.

11. A system as recited in claim 9, wherein to control the amount of each of the plurality of documents that is viewed includes determining the respective transparency function of said each of the plurality of documents at the determined tilt angle.

12. A system as recited in claim 9, wherein the document manager module is further configured to control the amount of each of the plurality of documents that is viewed based on the tilt angle being changed toward a reference tilt angle.

13. A system as recited in claim 9, wherein the document manager module is further configured to control the amount of each of the plurality of documents that is viewed without explicit user interaction with an application used to display the plurality of documents.

14. A system as recited in claim 9, wherein:
at least one displayed document of the plurality of documents comprises:
overlapping results of a comparison between an initial document and an updated document; and
annotations identifying differences between the initial document and the updated document; and
the amount of each of the plurality of documents that is viewed in the display is controlled based on a respective transparency setting of the at least one displayed document being set to cause one of the initial document or the updated document to be visible.

15. In a digital medium environment for presenting multiple documents of an application on a mobile device, a method comprising:
controlling a display of the multiple documents of the application based on a tilt angle of a housing of the mobile device, each document of the multiple documents having a respective transparency setting based on the tilt angle, the respective transparency setting formed by combining respective transparency settings, based on the tilt angle, of at least two of the multiple of documents different than said each document, the multiple documents including at least a first document and a second document, the controlling including at least:
responsive to the tilt angle indicating that the housing is not tilted, decreasing the respective transparency setting of the first document and increasing the respective transparency setting of at least the second document effective to cause the first document to be visible; and
responsive to the tilt angle indicating that the housing is tilted based on a comparison of the tilt angle with a tilt threshold, automatically decreasing the respective transparency setting of the second document and increasing the respective transparency setting of at least the first document effective to cause the second document to be visible.

16. A method as recited in claim 15, further comprising, based on a comparison of the tilt angle with an additional tilt threshold, automatically decreasing a respective transparency setting of a third document of the multiple documents and increasing the respective transparency setting of each of the first and second documents effective to cause the third document to be visible.

17. A method as recited in claim 16, wherein the first document includes annotated results of a comparison between the second document and the third document.

18. A method as recited in claim 15, wherein the first document includes annotated results of a comparison between the second document and a third document that is an updated version of the second document.

19. A method as recited in claim 15, wherein controlling the display of the multiple documents of the application is performed without explicit user interaction with the application.

20. A method as recited in claim 15, wherein the tilt angle is determined based on an amount of rotation of the housing about an axis relative to a reference plane.

* * * * *